United States Patent [19]

Kulitz

[11] Patent Number: 4,787,922
[45] Date of Patent: Nov. 29, 1988

[54] FILTER APPARATUS

[75] Inventor: Günter Kulitz, Ulm/Donau, Fed. Rep. of Germany

[73] Assignee: ESTA Apparatebau GmbH & Co. KG, Fed. Rep. of Germany

[21] Appl. No.: 1,202

[22] Filed: Jan. 7, 1987

[51] Int. Cl.[4] .......................................... B01D 50/00
[52] U.S. Cl. ...................................... 55/274; 55/316; 55/350; 55/473; 55/482; 55/484; 55/356
[58] Field of Search ........................... 55/6, 124–126, 55/274, 316, 350, 356, 357, 467, 473, 482, 484

[56] References Cited

U.S. PATENT DOCUMENTS

| 1,714,854 | 5/1929 | Dollinger | 55/484 |
| 2,035,400 | 3/1936 | Paine | 55/387 |
| 2,640,558 | 6/1953 | Dauphinee | 55/484 |
| 3,172,747 | 3/1965 | Nodolf | 55/387 |
| 3,488,928 | 1/1970 | Tarala | 55/274 |
| 3,936,284 | 2/1976 | Mason | 55/274 |
| 4,236,902 | 12/1980 | Fricke | 55/316 |
| 4,261,712 | 4/1981 | Kinkade | 55/126 |
| 4,268,282 | 5/1981 | MacKenzie | 55/126 |
| 4,515,609 | 5/1985 | Cuvelier | 55/270 |
| 4,629,479 | 12/1986 | Cantoni | 55/126 |
| 4,630,530 | 12/1986 | Eckstrom | 55/126 |
| 4,701,195 | 10/1987 | Rosendall | 55/316 |

FOREIGN PATENT DOCUMENTS

| 185797 | 9/1955 | Austria . | |
| 1127980 | 7/1982 | Canada | 55/126 |
| 1106057 | 5/1961 | Fed. Rep. of Germany . | |
| 2260055 | 6/1974 | Fed. Rep. of Germany . | |
| 2459356 | 6/1975 | Fed. Rep. of Germany . | |
| 8026283 | 3/1981 | Fed. Rep. of Germany . | |
| 8321286 | 1/1983 | Fed. Rep. of Germany . | |
| 8314766 | 6/1983 | Fed. Rep. of Germany . | |
| 2055357 | 5/1971 | France . | |
| 2243717 | 4/1975 | France . | |
| 435944 | 11/1967 | Switzerland . | |
| 390245 | 4/1933 | United Kingdom | 55/350 |

OTHER PUBLICATIONS

DE-Prospekt d. Fa. Norclean, OT-Oberflachentechnik, 8000 Munchen 45, 10, Woche 1983.
DE-Prospekt der Fa. Hans Erni AG, CH 8962, Berg-Dietikon, Schweibrauch-Absaugung Type E-1000, 10 Woche 1983.

Primary Examiner—Bernard Nozick
Attorney, Agent, or Firm—Steele, Gould & Fried

[57] ABSTRACT

A filter apparatus, particularly for filtering air containing fumes is provided on the inlet side to an exhaust fan (8), electrostatic filters (36) and a flat test filter (38) immediately following the latter. On the outlet side of the exhaust fan (8) a cartridge filter (3) with a plurality of parallel filter cartridges (26) in the flow path is provided. In the flow path directly upstream of the test filter 38, as well as between outlet (14) and the inlet of cartridge filter (3), the pressure is measured by in each case one pressure indicating device (53, 54). When the electrostatic filter (36) becomes saturated, the contamination relatively rapidly increases the flow resistance of test filter (38), which is indicated by a pressure change between the electrostatic filter (36) and the test filter (38). If electrostatic filter (36) is not cleaned, then contamination then increases the flow resistance of cartridge filter (13), which is indicated by a pressure change in the flow path directly upstream of the cartridge filter (3). If there is still no cleaning or replacement of electrostatic filter (36), then the flow resistance becomes higher than the suction force of exhaust fan (8), so that the fact that no further suction is taking place is made immediately apparent.

21 Claims, 5 Drawing Sheets

FILTER APPARATUS

FIELD OF THE INVENTION

The invention relates to a filter apparatus for particle-containing polluted air, particularly smoke-containing polluted air at workplaces and the like. In particular the invention relates to a device with an apparatus housing which has a poluted air intake opening and an external exhaust air outlet for the filtered air, connected to the intake opneing via a flow path with an interposed exhaust fan having an inlet and an outlet and at least one filter.

PRIOR ART

Filter apparatus of this type, which are in particular used for exhausting, filtering and returning smoke and soot-containing air are e.g. used in connection with welding, in order to exhaust the polluted air directly from the point being welded. The filter residues which accumulate usually lead to a relatively rapid contamination of the filters used. Therefore, as a function of the filter type employed, either the flow resistance of the filter is increased to such an extent that abruptly there is no longer any exhausting action, or after a certain saturation of the filter no filtering occurs and instead the air passes out again virtually unfiltered. Both cases are extremely disadvantageous, both with respect to the pollution of the surrounding area and with respect to the resulting health risks.

SUMMARY OF THE INVENTION

An object of the invention is to provide a filter apparatus of the described type which, having small dimensions, on the one hand has a long service life and on the other easily reveals when the filter or filters become ineffective, thereby clearly showing that filter replacement is necessary.

According to the invention this problem is solved by a filter apparatus of the aforementioned type, which is characterized by at least one flat or surface filter covering a large part of a cross-section of the apparatus housing and behind which is connected or arranged a cartridge filter with a plurality of parallel connected or parallel arranged filter cartridges. The flat filter acts as a prefilter and is e.g. designed in such a way that it holds back a significantly smaller part of the residues to be filtered than the cartridge. The flat filter can be construdted in such a way that in the unpolluted and less polluted state it has a very low flow resistance, but beginning at a predetermined higher degree of saturation its flow resistance rapidly rises. The flat filter is appropriately so matched with respect to the cartridge filter that it reaches its maximum flow resistance, which is close to complete flow or passage closure, before the cartridge filter has completely clogged. The flat filter, which e.g holds back approximately 20% of the residues to be filtered, can be replaced easily and at a low cost, so that the service life of the douwnstream filter cartridges is significantly increased. The clogging of the flat filter gradually so clearly limits the exhausting action through the filter apparatus, prior to reaching the saturation of the cartridge filter, that a clear indication is provided thereby of the need to replace the filter.

The cartridge filter can in simple manner be arranged in the flow path following the exhaust fan outlet. Preferably between the exhaust fan outlet and the cartridge filter is provided a surge or stabilizing chamber, which leads to a uniform distribution of the air passing through the cartridge filter over the inlet surface thereof. This leads to a uniform loading of all the filter cartridges.

The filter apparatus can be made particularly compactly, if the exhaust fan is positioned within the apparatus housing, particularly within the stabilizing chamber taking up essentially the entire apparatus housing. Preferably an exhaust fan drive motor is located on the outside of the apparatus housing so as to be protected from dirt. The fan rotor is arranged on the inside and the drive motor on the outside of an upright wall of the apparatus housing so as to be coaxial with one another. Advantageously a suction duct runs from the inlet of the exhaust fan in an overhanging or central manner through the stabilizing chamber to a facing inlet wall of the apparatus housing and through the same out of the apparatus housing. The exhaust fan with its radial outlet, formed by at least one outlet port in a fan housing, issues into the surrounding apparatus housing, so that the suction duct also contributes to stabilizing the air flowing through the stabilizing chamber.

The cartridge filter can be arranged in very space-saving manner and with a large-area inlet, if it is arranged so as to essentially cover one side of the apparatus housing, and in particular the top surface of the housing and if this side of the apparatus housing, associated with an inlet side of the cartridge filter, is open over essentially the full width and is covered with a base plate of a cartridge filter housing. The base plate has a central filter cartridge inlet port for each of the filter cartridges juxtaposed in the same plane in a grid pattern.

In order to be able to easily replace the sleeve-like further cartridges which are open at both ends and despite favourable flow or operating conditions, the cartridges are secured with their end faces in centered manner between two plates, whereof one has filter cartridge inlet ports defined by plug flanges and the facing plate is constructed as a closure plate for the associated open sleeve ends of the filter cartridges. The filter cartridges, whose sleeve ends are generally formed by toroidal ring packings, each can be secured in spaced self-supporting manner by mounting on the annular plug flange sealingly engaging therein, and by retaining the cartridges with the facing closure plate and without further fastening means. Appropriately these two plaets are outer walls of the cartridge filter housing, one of whose walls at right angles thereto has the exhaust air outlet in the form of exhaust air outlet ports. The outlet ports are defined by slots or the like. The filtered exhaust air on all cartridge filter housing walls at right angles to said plate can pass into the open again through an exhaust air outlet with a very large total cross-section and therefore at a low speed immediately after leaving the cartridge filter. The walls having the exhaust air outlet can e.g. be formed by venetian blind slats, provided over most of the surface thereof with outlet slots distributed in grid-like manner.

The cartridge filter can be followed by at least one afterfilter, which is appropriately designed in such a way that it filters undesired gaseous constituents out of the air, i.e. for example those gaseous constituents perceptible as odor. Such an afterfilter is appropriately formed by a flat activated carbon filter, preferably arranged as an end filter adjacent to the filter cartridges directly on the inside of the outer wall of the cartridge housing which has the exhaust air outlet ports. Thus, very large-area afterfilters, which take up little space and have a low flow resistance can be used and which as a result of the preceding filtration are not exposed to dirt particles. If in a view of the filter cartridges, the cartridge filter housing is square, then identical afterfilters or afterfilters of the same size can be provided on all four outer walls, which greatly facilitates the storage and replacement thereof.

In the case of a simple embodiment, at least one of the flat filters is located between the outlet of the exhaust fan and the cartridge filter, particularly with limited spacing adajcent to and/or parallel to its inlet side, so that all the filters of the filter apparatus are close together and of the filter easily accessible. Independently thereof, appropriately at least one device, such as a signal device is provided for monitoring the pressure in the flow path immediately before and/or after the flat filter, so that the degree of contamination of the particular filter is even more clearly indicated. The pressure measuring device measuring upstream of the flat filter, as a result of the rising pressure in the stablizing chamber indicates the increasing contamination of the flat filter. The pressure measuring device measuring downstream of the flat filter, by means of the pressure in the intake chamber of the cartridge filter, indicates its degree of contamination. Instead of directly measuring the pressure with a pressure gauge or the like, it is also conceivable to measure with a corresponding device another magnitude, e.g. a flow rate correlating with the pressure, for indication or control signal purposes.

If when filtering the air with a filter apparatus of the described type use is made of an electrostatic precipitator or filter, i.e. an electrostatically acting filter collector, the important disadvantage often arises that after a certain sauration of the electrostatic filter, although the particles to be filtered are ionized, they are not held in the filter and are instead forced out of it again in the ionized state. Thus, the ionized particles again pass into the atmosphere and cling to walls, machines and other means in the work areas with even more disdavantageous consequences than in the case of non-ionized particles. It is therefore particularly important with such filter apparatuses to be able to simply detect the degree of contamination of the electrostatic filter and to ensure that the saturation of the latter is readily apparent, despite its encapsulated placement in the flow path. It is proposed for solving this problem in the case of a filter apparatus of the described type, that apart from the electrostatic filter, a mechanical follow-up filter follows the same in the flow path, with a limited flow resistance in the clean state and whose flow resistance increases with contamination. Preferably a device, such as a signal device is provided for monitoring the pressure in the flow path upstream of the follow-up filter. As soon as the electrostatic filter is close to saturation and ionized particles are drawn through the electrostatic filter into the further flow path, the flow resistance of the follow-up filter rises through retaining the drawn-through ionized particles, so that there is a clear rise in the pressure in the flow path upstream of the follow-up filter, e.g. from below to above 5 mbar, which is indicated by the monitoring device. In the case of a simple construction, the follow-up filter is formed by the cartridge filter, so that the reading provides a clear indication of the necesary replacement of the filter cartridges. If the filter cartridges are not replaced, they tend to completely close the passage, which leads to an immediately apparent stoppage of exhaust are at the exhausting point.

The reliability of the filter apparatus can be significantly further improved in that between the electrostatic filter and the follow-up filter a test is provided, having a limited flow resistance in the clean state and rapidly rising flow resistance in the case of the saturation of the electrostatic filter. A device, such as a signal device is provided for monitoring the pressure in the flow path upstream of the test filter. The particles let through by the electrostatic filter are consequently no longer moved up to the follow-up filter and are instead trapped beforehand by the test filter, which is then used in place of the follow-up filter as an indicator of the degree of contamination of the electrostatic filter. It must be borne in mind that in both cases the electrostatic filter initially separates virtually all the particles from the polluted air, i.e. in normal operation the following filters, apart from possibly the odor filter, are in no way stressed or loaded and essentially retain their clean state. Only if the electrostatic filter comes close to its saturation limit, do the following filters (and in the latter case only the test filter) receive particles. The test filter is designed in such a way that its flow resistance rises rapidly as a result of the contamination causes, so that the pressure in the flow path upstream of the test filter drops e.g. from approximately 15 to 5 mbar and leads to a corresponding signal.

The effects can be significantly improved in that the exhaust fan is protected from the action of dirt, particularly ionized particles and consequently falsified pressure values are not obtained through the clogging of the exhaust fan.

This can be achieved in a simple manner in that at least one filter, particularly at least one test or flat filter and/or at least one primary filter, particularly in the form of at least one electrostatic filter, is located on the inlet side of the exhaust fan, preferably adjacent to and/or between the inlet of the exhaust fan and the dirty air intake opening. As a result of this arrangement a very compact filter apparatus construction is obtained.

A particularly advantageous further development of the invention is obtained in that the inlet-side test filter with the primary filter is arranged in a primary filter housing having the dirty air suction or intake port. The primary filter housing is preferably flow-connected with the apparatus housing solely by the inlet-side test filter, so that all the air passing through the primary filter housing reaches the exhaust fan. The primary filter housing can be integrated in a simple manner with the apparatus housing e.g. in that it is arranged therewith on a common, e.g. movable underframe. Thus, the inventive filter apparatus is particularly suitable as a mobile apparatus, e.g. as an self-propelled apparatus, which can in simple manner be brought to any random work place and is ready to operate solely by connection to electric power. Particularly if the primary filter housing is connected to an upright outer wall of the apparatus housing with roughly the same associated cross-section, a very compact construction is obtained through the successive arrangement of the two housings. The apparatus housing can form a closed subassembly with the exhaust fan and optionally the pressure measuring and indicating devices. This is suitable for the construction of a filter apparatus without electrostatic filter and for constructing a filter apparatus with electrostatic filters. In the latter case, the primary filter housing, which forms a closed standard unit with the receptacles for the electrostatic filters and optionally the associated further filters, is merely fixed in congruent manner on an upright wall of the apparatus housing, virtually as an extension thereof. Therefore a correspondingly extended overall housing is obtained. The cartridge filter housing also forms a closed removable standard unit with mounting supports for the associated filters, said standard unit being mounted on the top of the apparatus housing, optionally adjacent to the primary filter housing. Thus, the apparatus housing forms the basic housing, on which the different filter units can be arranged in the form of standard units.

The pressure monitoring device provided in the flow path upstream of the follow-up filter is appropriately associated with the apparatus housing, i.e. that area in the flow path which is on the outlet side with respect to the exhaust fan and which is appropriately formed by the stabilizing chamber. However, the other pressure monitoring device appropriately measures the pressure in the primary filter housing and namely on the outlet side from the primary filter, but upstream of the inlet side thereof when providing a test filter associated therewith. Appropriately two pressure gauges are juxtaposed on an outer wall of the apparatus housing, so that they form the associated standard unit therewith.

The action of the particular filter located on the inlet side with respect to the exhaust fan can be further improved in that the suction duct of the exhaust fan has a suction or exhaust funnel widened towards the inlet wall leading to the inlet-side test filter and/or primary filter and connected to the inside of the inlet wall, so that there is a substantially uniform flow through the entire surface area of the particular filter. The inlet-side test filter is appropriately adjacent to the funnel opening and independent thereof, being parallel to said funnel opening, so that very favourable flow conditions occur.

To protect the primary filter, particularly from coarse particles, sparks, etc, at least one inlet-side flat filter is appropriately connected upstream of the primary filer, so that flat or test filters can be arranged on either side of the primary filter.

It is desirable to obtain a uniform air action and therefore uniform contamination on the inlet side of the first filter, e.g. the primary filter following the suction port in the flow path and namely over the entire surface extension of the said filter. Accordingly the inlet side of the latter is located in a distributing chamber whose surface size at least approximately corresponds thereto, into which the contaminated air enters in a direction differing from the direction directed approximately at right angles to the inlet side of said filter. Thus, the entering contaminated air is not guided against the inlet side of said in a concentrated jet corresponding to the cross-section of the suction or intake port and is instead initially distributed in the distribution chamber roughly over the size of said inlet side without deflection, so that it can then uniformly pass through the filter. In a very simple embodiment the dirty air intake opening is located on a housing wall at right angles to the inlet side of the filter, in particular the upper housing, wall of the primary filter housing and is spaced from the disturbing chamber, so that the air initially flows against a filtered side at right angles to the inlet side, is deflected thereon and is introduced in angular manner, e.g. roughly parallel to the inlet side into the distributing chamber.

A particularly advantageous further development, particularly of a filter apparatus of the described type comprises a contaminated air intake opening directly formed by a housing side to be opened, particularly the housing side associated with the inlet side of the first filter in the flow path, so that unlike in the normal case suction does not take place via suction hoses with suction funnels at a distance from the actual filter apparatus and instead the housing forms the suction funnel, through which the dirty air or fumes are sucked directly into the primary filter and without any further deflection. This can be simply achieved in that the associated side of the housing can be closed by a housing wall which can be hinged to a suction or extraction hood, preferably essentially over the entire height and/or width thereof.

As the contaminated air to be filtered frequently also contains oil fumes and the like which have separated through condensation, appropriately the primary or electrostatic filter is upright or vertical in plate or cassette-like manner, so that the oil or the like can easily flow downwards. To collect the separated oil an emptiable oil separating vessel is arranged in the lower part of the primary filter housing and can be emptied by means of e.g. an outlet tube provided with a check valve. In order that the separating vessel covers the complete area in which oil or the like drips, it is preferably constructed as a correspondingly large-area separating trough.

The particular flat or test filter appropriately comprises a soft mat with a paper filter upstream thereof, which has a flow resistance characteristic which rises rapidly in the case of contamination. The actual filter material is appropriately arranged in a filter frame between wide-meshed grids or the like, so that rapid replacement is possible. These filters are appropriately constructed as planar, plate-like structures. Thus, a filter system is provided, which in normal operation substantially only operates with the electrostatic filter or filters, all the following filters having no effect. Only when the electrostatic filters have not been cleaned as needed do the safety filters come into operation and this is clearly stepwise indicated as a function of the number of monitoring devices. Through additional security provided by the cartridge filter, contamination of the final activated carbon filter provided for odor reduction purposes, and resulting a rapid decrease in the activity thereof are prevented.

These and further features of the preferred further developments of the invention can be gathered from the description and drawings and the individual features can be realized in any embodiment of the invention and other fields either singly or in the form of subcombinations.

BRIEF DESCRIPTION OF THE DRAWINGS

Embodiments of the invention are described hereinafter relative to the drawings, wherein show.

DETAILED DESCRIPTION OF THE PREFERRED EMBODIMENTS

Figure 1:
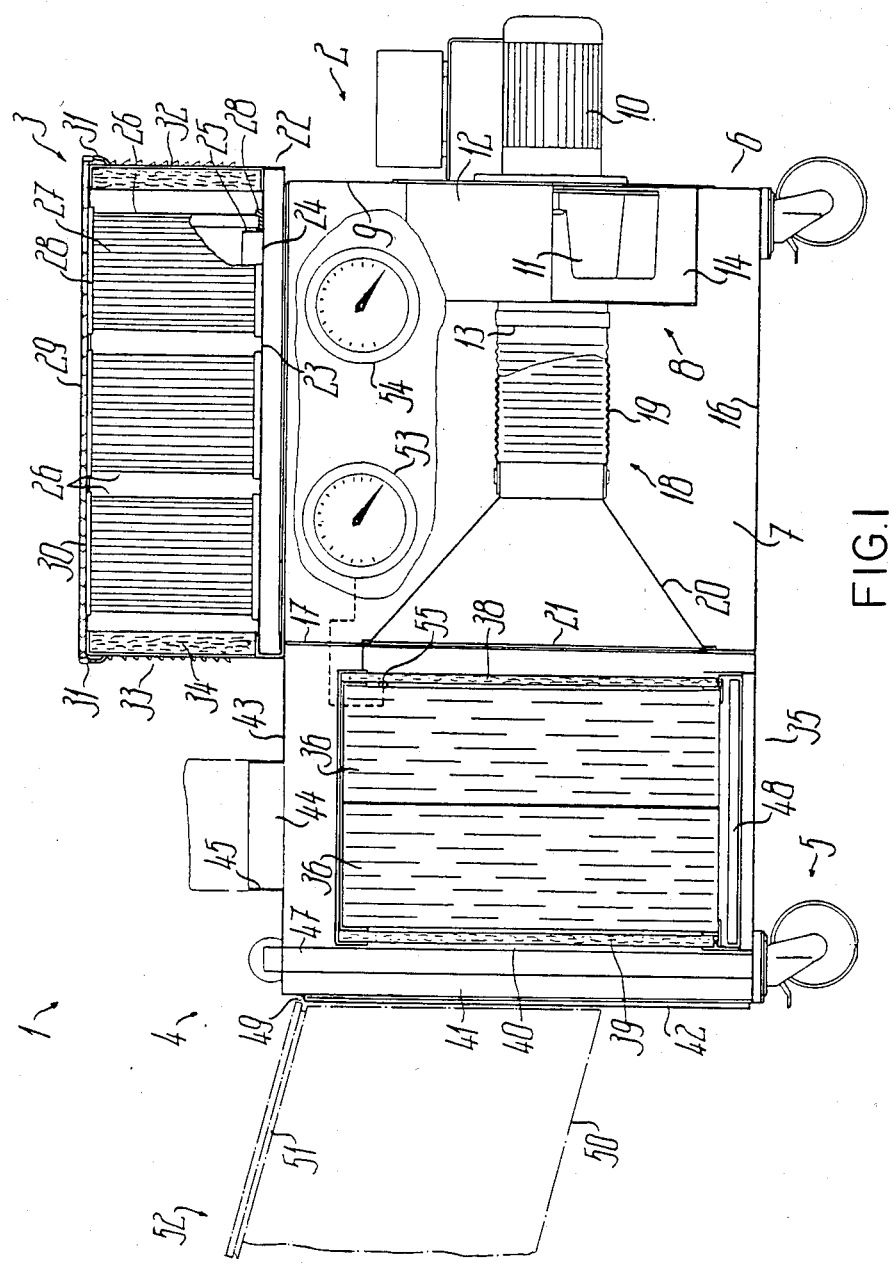
FIG. 1, an apparatus according to the invention essentially in sectional side view.
Figure 2:
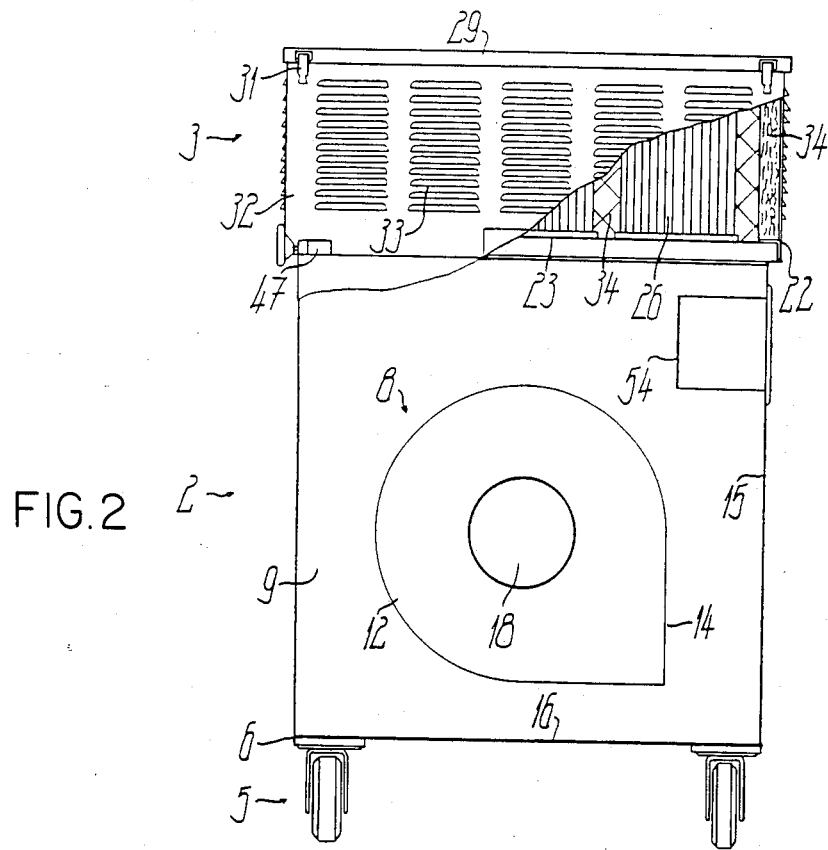
FIG. 2, the filter apparatus according to FIG. 1 in part sectional end view from the left.
Figure 3:
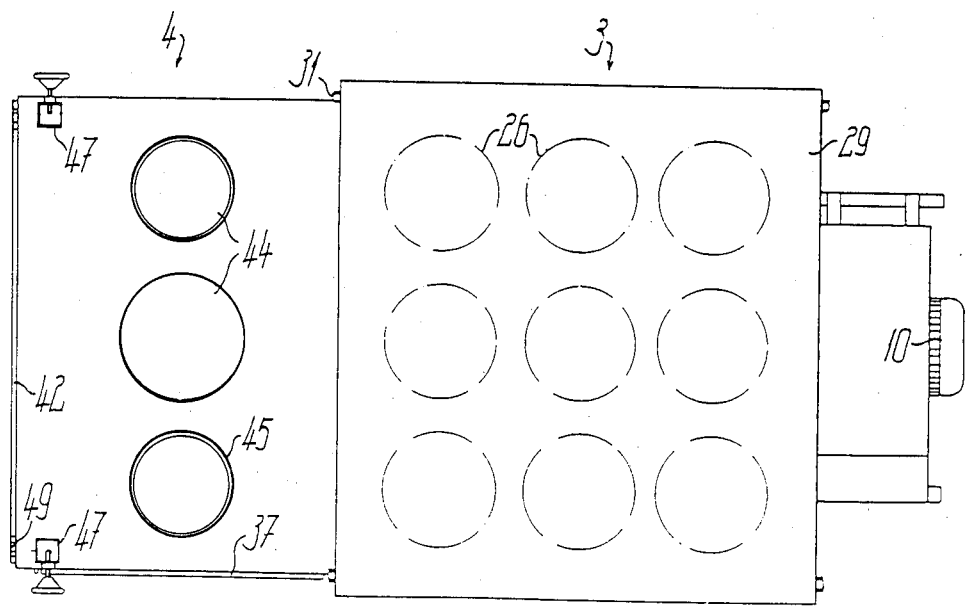
FIG. 3, the filter apparatus according to FIG. 1 in plan view.

The filter apparatus 1 shown in FIGS. 1 to 3 essentially comprises three standard units, namely a filterless basic apparatus 2, a cartridge or afterfilter 3 following in the flow path thereof and a primary filter 4. On its bottom, the substantially cubic filter appartus 1 has a chassis 5, e.g. in the form of at least three casters individually fixed to the bottom thereof.

In plan view and possible in at least one side view, the basic apparatus 2 has an almost square, i.e. an approximately cubic appratus housing 6, whose inner area defines a tranquilizing or stabilizing chamber 7 which is substantially closed in the operating state. The apparatus housing 6 contains an exhaust fan 8 with a horizontal rotor central axis and fixed to the upright housing wall 9 remote from primary filter 4. A fan drive motor 10 is fixed in overhanging and projecting manner to the outside of said wall 9 coaxial with to exhaust fan 8 in such a way that its driven shaft passes through wall 9 and carries the fan rotor 11 surrounded by a fan housing 12. Exhaust fan 8 is inserted from the outside through a correspondingly large opening in wall 9 and is fixed to said wall 9 by a flange plate carrying the drive motor and engaging on the outside of wall 9. The fan housing 12, which projects only slightly axially into the stablizing chamber 7, has on its side remote from wall 9 an inlet located in its central axis in the form of a connecting piece and a tangential connection to an outlet 14 extending over its axial extension on the circumference. The outlet 14, spaced above the bottom of stabilizing chamber 7, is directed against an adjacent housing wall 15, namely the inside of the front wall and has a much smaller distance from the bottom of stabilizing chamber 7 than from its top. Inlet 13 is led by a straight, horizontal intake duct 18 located in the central axis of the fan to an inlet wall 17 of housing 6 formed by wall 17 facing wall 9. Intake duct 18 is located without contact roughly in the center of tranquilizing or stabilizing chamber 7, its portion connected to the inlet connection 13 being formed by a flexible bellows hose 19. Its portion connected to inlet wall 17 is formed by a suction funnel 20, which is widened on most of the surface of inlet wall 17 and is fixed to the inside of wall 17 around an inlet port traversing wall 17. The vertical funnel opening 21 is connected to primary filter 4.

Cartridge filter 3 also has a housing 22, which is square and only has a slightly larger ground plan than housing 6, its height being much smaller than the associated edge length. The base plate 23 of housing 22 has in a rectangular grid a plurality of juxtaposed and successively arranged inlet ports 24, which are in each case formed by an upwardly directed annular plug flange 25, on which is mounted a filter cartridge 26, which comprises a sleeve-like arranged corrugated bellows 27 made from flat filter material and two ring packings 28, which are located at the ends of the sleeve shape and receive the sleeve edge of the corrugated bellows 27. Opposed to the base plate 23, i.e. on the top surface of the cartridge filter housing, housing 22 has a closure plate 29 constructed as a detachable cover and which is secured against the upper end faces of filter cartridges 26. A plastic insert of foam or the like is interposed and is locked in position with bolts 31. As a result of closure plate 29 the ends of filter cartridges 26 remote from inlet ports 24 are tightly closed, so that air can only pass out through the corrugated bellows 27 thereof, i.e. on the outer circumference. The nine filter cartridges 26 are spaced from one another and from the outer walls 32 of housing 22 at right angles to plates 23, 29. These outer walls 32 have the exhaust air outlet 33 of filter housing 1 in the form of numerous outlet ports, which are distribued over the entire height and width of each wall 32. The insides of walls 32 are covered with an afterfilter 34, which is appropriately formed by a plate-like or framed activated carbon filter. Housing 22 is placed with its base plate 23 on the top surface of housing 6 whose entire width is open and is secured by suitable fastening members, in such a way that the cartridge filter is only open to the stabilizing chamber 7 via inlets 24. As a result of the described arrangement outlet 14 is not directed against cartridge filter 3, but in a direction diverging therefrom, namely at right angles to the central axes of inlet ports 24.

Primary filter 4 has a primary filter housing 35, whose associated upright wall is arranged on the inlet wall 17 of apparatus housing 6 and is e.g. fixed with through-screws. Housing 35 has the same height and width as housing 6, so that the side walls of the two housings are connected in the same plane. Housing 35 contains two upright electrostatic filters 36, which directly follow one another in the longitudinal direction of the suction or intake duct 18, in such a way that they completely cover the funnel opening 21. On the front wall of housing 35 is provided a door 47, which when opened makes it possible to draw the electrostatic filters 36 out of corresponding mounting guides. Immediately adjacent to the side of the two-part electrostatic filter 36 facing the intake duct 18 is provided a flat test filter 38, which has roughly the same surface size as electrostaic filter 36 and faces the funnel opening 21 with a limited spacing. On the other side of electrostatic filter 36 is provided a roughly identically dimensioned and/or constructed flat filter 39 in the same way. The flow takes place through filters 36, 38, 39 at right angles to their largest, vertical surfaces, i.e. flow takes place therethrough in succeeding manner from the inlet side 40. The latter is located in a distributing chamber 41 of housing 35 which at least has a greater height and optionally also a greater width than the filter inserts and namely extends over the entire height and width of housing 35. On its side remote from inlet side 40 it is so defined by the housing wall 42 remote from basic unit 2 that it only has a relatively limited depth. In the upper cover wall 43 of housing 35, which is spaced above the receptacle for the filter inserts level with the top of housing 6, is provided at least one dirty air intake port 44 and in the present case there are three juxtaposed suction ports 44 parallel to inlet wall 17. Each suction port 44 is defined by an upwardly projecting connecting piece 45, which is constructed as a plug connection for a suction hose to be plugged on for connection to a suction funnel or the like. The dirty air entering housing 35 through the suction port 44 is initially deflected roughly horizontal to distributing chamber 41 on the top surface of the filter inserts and enters the said chamber in downwardly angled manner, in such a way that it reaches and flows through the filter inserts in uniform surface distribution. Hinged arms can be provided for holding the suction hoses or suction funnels for the intake ports and they can be fixed or secured in telescopic mounts of housing 35.

On the bottom of the filter inserts of primary filter 4 a trough-shaped separating vessel 48 is positioned directly above the bottom of housing 35 and collects the oil which drips from the filter inserts. An emptying duct (not shown) leads out of housing 35 from separating vessel 48.

In the vicinity of its upper horizontal edge, the housing wall 42 is foldably mounted on the remaining housing 35 by means of a hinge 49, so that it can be folded downwards e.g. into the position indicated in dot-dash line manner in FIG. 1, in which the associated side of the housing 35, i.e. the distributing chamber 41 is freely open. In the vicinity of the lateral edges two shielding walls 50 are pivotably mounted with hinges 51 on wall 42 in such a way that when the latter is closed they are located on the inside thereof, and when it is open they hang down on either side leading to the formation of a suction directed into exhaust hood 52 on the bottom surface and open at the free end, which is connected at the top and side in a substantially sealed manner to the inner area of housing 35, i.e. to distributing chamber 41 or inlet side 40.

On basic unit 2 and namely on housing 6, are provided two pressure monitoring devices 53, 54, for example pressure gauges. These devices are fixed to the front side wall 15 and are provided on the outside thereof with an indicating means in the form of a rotary pointer associated with a pressure scale. The measured value generator 55 or pressure sensor of one device 53 is located in the flow path between the last electrostatic filter 36 and the test filter 38, which have limited spacing from one another. The other device 54 directly measures the pressure in stabilizing chamber 7.

The described filter appratus operates according to the following process. On normally operating the suction fan 8, contaminated air is sucked into housing 35 via suction port or ports 44. As described, the air is supplied via disturbing chamber 41 to coarse filter 39 and from the latter passes directly into electrostatic filters 36. If the latter have not reached their saturation point, they retain the particles in the contaminated air almost entirely due to electrostatic adhesion, so that virtually only particle-free air passes through the test filter 38, which is not contaminated. The air passes via suction funnel 20, bellows hose 19 and inlet 13 into exhaust fan 8 and being directed against wall 15 by the fan, and thus is supplied to the tranquilizing or stablizing chamber 7. The stabilized air then passes through inlet ports 24 into filter cartridges 26, passes through the filter bellows 27 thereof without contaminating the same and is finally filtered of odors in activated carbon filters 34. The air then passes into the open through outlet 33. As soon as the capacity of the electrostatic filters 36 starts to become exhausted, the particles, and associated fumes pass through the electrostatic filters 36 and at least the coarser particles thereof engage test filter 38. As a result there is a steep rise in its flow resistance, so that the vacuum measured by the measured value generator 55 directly upstream of test filter 38 drops, i.e. the pressure in this area rises and is indicated by device 53. If the electrostatic filters 36 are not then removed and cleaned or replaced by cleaned filters, then the flue gases also pass through the test filter 38 and enter the stabilizing chamber 7 and from there pass into the cartridge filters 3 serving as afterfilters and whose flow resistance then also starts to rise. Therefore there is a considerable rise in the pressure in the stabilizing chamber 7 and this is indicated by device 54. If once again there is no cleaning or replacement of the filters, the test filter 38 and cartridge filter 3 become increasingly clogged or blocked, said filters being matched to one another in such a way that with respect to the pumping force of exhaust fan 8, after only a relatively short operating time they produce such a high flow resistance that virtually no further air is sucked through suction port 44. This ensures that also at the suction point it is clearly indicated that the filter apparatus is no longer working and no further particles can be ionized in the electrostaic filter and discharged through outlet 33. On operating with suction hood 52 the suction ports 44 are closed e.g. by mounted covers and the dirty air is supplied in large-area manner through hood 42 directly to the filter inserts of primary filter 4.

Figure 4:
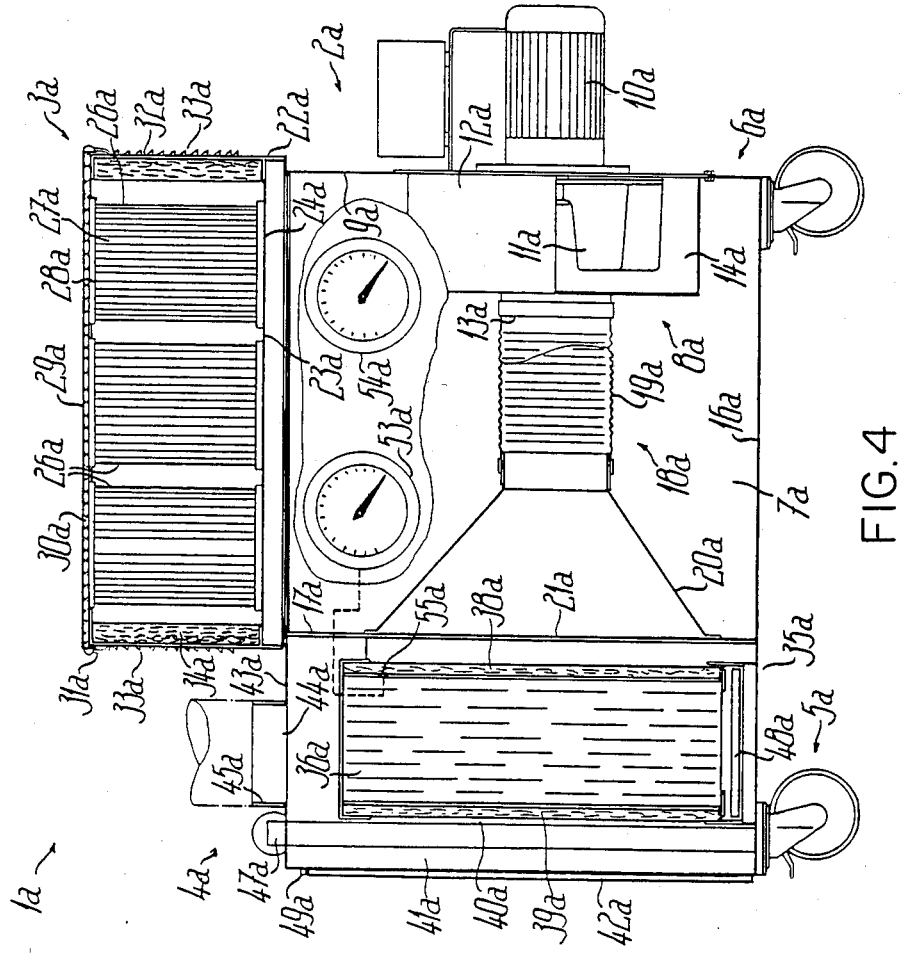
FIG. 4, a further embodiment in a representation corresponding to FIG. 1.
Figure 5:
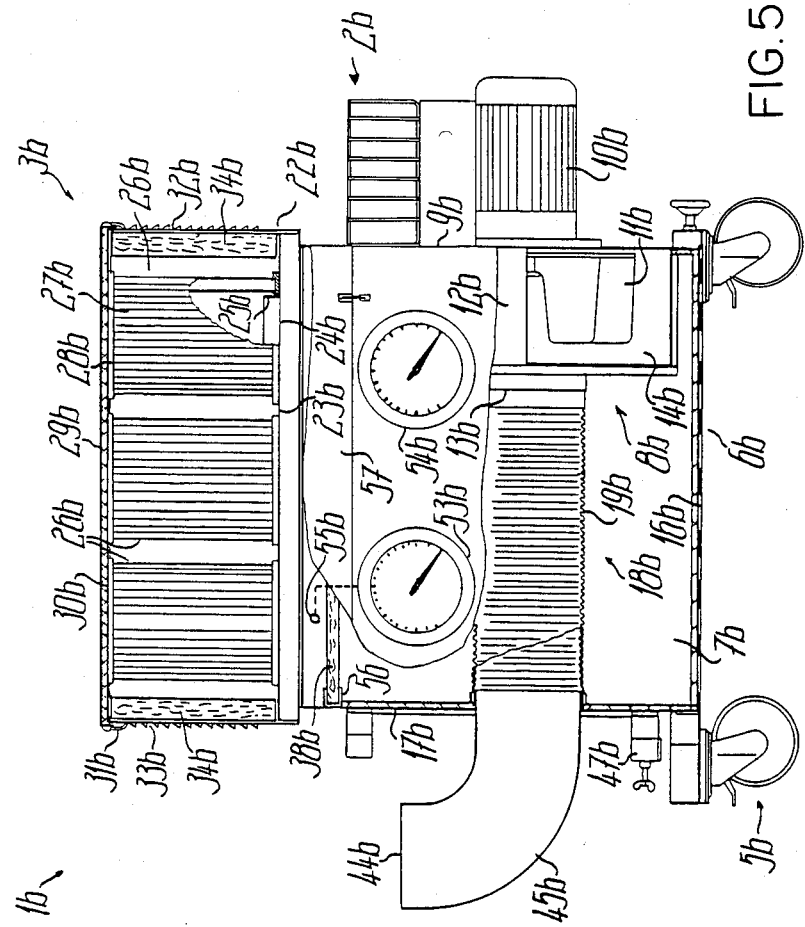
FIGS. 5 to 7, another embodiment in representations corresponding to FIGS. 1 to 3.
Figure 6:
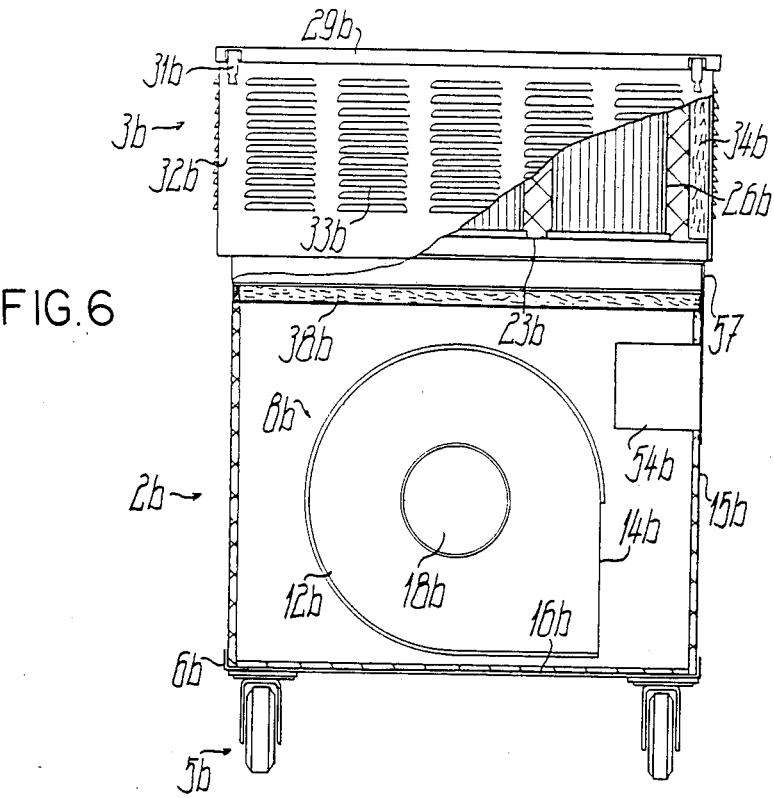
Figure 7:
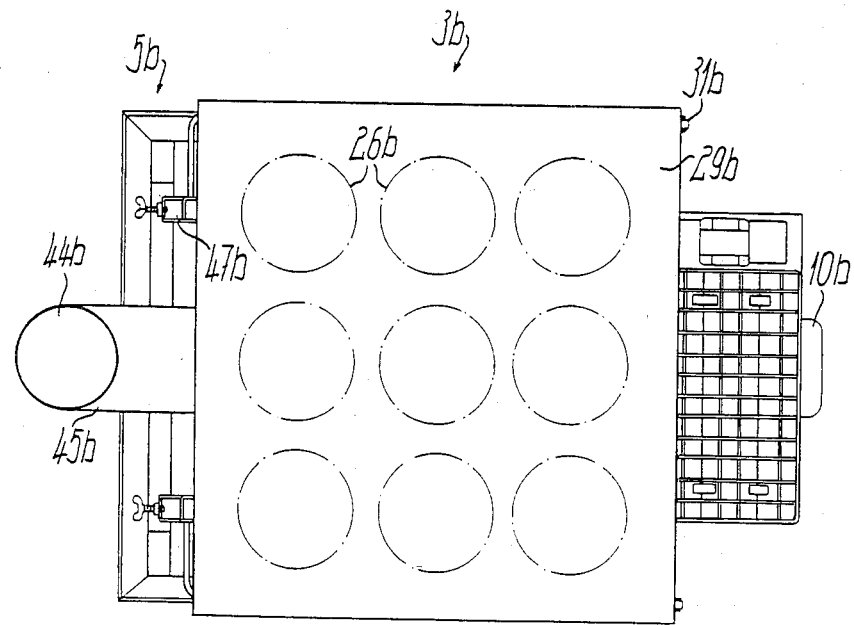

In FIGS. 4 to 7 corresponding parts are given the same reference numerals as in FIGS. 1 to 3, but in FIG. 4 followed by an a and in FIGS. 5 to 7 by a b.

The embodiment according to FIG. 4 differs from that of FIG. 1 essentially only that a much smaller primary filter 4a is provided, which only has a single electrostatic filter 36a. The standard units forming the basic unit 2a and cartridge filter 3a are consequently the same as in the embodiment according to FIGS. 1 to 3, whereas a different and namely smaller standard unit is used for primary filter 4a. The operation of the filter apparatus 1a according to FIG. 4 is the same as in that of FIGS. 1 to 3, except for the smaller saturation capacity of the primary filter 4a.

FIGS. 5 to 7 show a filter apparatus 1b, which is much simpler to that according to FIGS. 1 to 4, namely not having the standard unit constituted by primary filter 4 or 4a. However, the basic apparatus 2b and the cartridge filter 3b are essentially the same as in the previously described embodiments.

However, the basic apparatus 2b differs from that of the embodiments according to FIGS. 1 to 4 in that the intake duct 18b is not widened in funnel-like manner, but is instead led in the manner of a through hose 19b to the inlet wall 17b, to which is fixed an elbow tube 45b, whose end projecting into the stabilizing chamber 7b is connected then the associated end of hose 19b and whose overhanging, upwardly pointed end forms the dirty air suction port 44b and therefore serves for mounting suction hose or the like. In the flow path upstream of cartridge filter 3b, namely within the stabilizing chamber 7b or as the upper cover for the same, test filter 38b is arranged at a limited distance below the inlet side, i.e. below the associated end faces of filter cartridges 26b or below inlet ports 24b. The test filter is arranged horizontally, namely parallel to the inlet side of cartridge filter 3b. For this purpose, on the insides of wall 9b, 17b of housing 6b are provided plug guides 56, into which the test filter 38b can be inserted in such a way that dirty air can only pass through it into the cartridge filter 3b. The front housing wall 15b is constructed as a flap 57 above the pressure measuring devcies 53b, 54b and can be opened for drawing out test filter 38b. By means of the measured value generator 55b, the pressure measuring device 53b measures the pressure in the flow path following the test filter 38b and above the cartridge filter 3b, whilst the pressure measuring device 54b measures the presssure in stabilizing chamber 7b. Thus, in the described manner, device 53b monitors cartridge filter 3b, whilst measuring device 54b monitors the degree of contamination of test filter 38b. Thus, in this embodiment all the filters 3b, 38b are in the flow path following the outlet 15b of exhaust fan 8b. The service life of the filter cartridges 26b is considerably increased through the test filter 38b serving as a prefilter.

I claim:

1. A filter apparatus for contaminated air containing contaminents such as dust particles and smoke, said apparatus comprising:
   an apparatus housing (6) having upright sides and a top side, said apparatus housing (6) having a suction opening (44) for the contaminated air and an external air exhaust (33) for filtered air;
   means in the housing defining a flow path connecting said suction opening (44) and said air exhaust (33), said flow path defining a flow direction;
   a suction fan (8) having an inlet (13) and an outlet (14), said suction fan (8) being interposed in said flow path between a suction part and a pressure part of the flow path;
   at least two filter units (39, 36, 38, 26, 34) interposed in said flow path between said suction opneing (44) and said air exhaust (33), at least one of said filter units having at least one flat filter (39, 38) covering at least a part of a cross-section of a flat filter housing (35) disposed in the flow path, wherein a cartridge filter (3) having a plurality of parallel-connected filter cartridges (26) is provided downstream along the flow direction from the flat filter (39, 38) and the outlet (14) of the suction fan in the pressure part of the flow path, said cartridge filter (3) having an inlet base (23) mounted on a top side of the housing.

2. A filter apparatus according to claim 1, wherein a flow tranquilizing chamber (7) for stabilizing flow of the air is provided between the outlet (14) of the suction fan (8) and cartridge filter (3).

3. A filter apparatus according to claim 1, wherein the suction fan (8) is arranged within the apparatus housing (6), a drive motor (10) for the suction fan (8) being provided on an outside of the apparatus housing (6), the suction fan (8) being arranged within the flow tranquilizing chamber, said flow tranquilizing chamber substantially taking up available space within the apparatus housing (6).

4. A filter apparatus according to claim 1, wherein the suction fan (8) is arranged on an upright wall (9) of the apparatus housing (6), a suction duct (18) being passed from the inlet of the suction fan (8) to an inlet wall (17) facing the suction fan (8), said suction duct further being passed through said inlet wall (17) out of the apparatus housing (6).

5. A filter apparatus according to claim 1, wherein the suction fan (8) is surrounded by the apparatus housing (6), said suction fan (8) issuing directly into the apparatus housing (6) by means of the outlet (14) formed by at least one tangential outlet port of a fan housing (12).

6. A filter apparatus according to claim 1, wherein the cartridge filter (3) is arranged so as to substantially cover one side of the apparatus housing (6), the apparatus housing (6) having a top surface, said cartridge filter (3) covering said top surface.

7. A filter apparatus according to claim 1, wherein said apparatus housing (6) has a width extension, said apparatus housing (6) being open over substantially entirely said width extension in the vicinity of the inlet base (23) of the cartridge filter (3), thereby forming an open side covered with a base plate (23) of a cartridge filter housing (22), said base plate (23) having a filter cartridge inlet port (24) for each of the filter cartridges (26) juxtaposed in a common plane in a grid pattern.

8. A filter apparatus according to claim 1, wherein the contaminated air is led into said filter cartridges (26) via a central filter cartridge inlet port (24) provided for each of the filter cartridges (26).

9. A filter apparatus according to claim 1, wherein the filter cartridges (26) of the cartridge filter (3) have sleeve ends providing end faces, said filter cartridges (26) being open in a sleeve-like shape at both end faces, said end faces being strained in centered manner between two opposite plates (23, 29) of which one plate (23) has filter cartridge inlet ports (24) defined by plug flanges (25) and of which the other plate is constructed as a closure plate (29) for the associated open sleeve ends of the filter cartridges (26), said two plates (23, 29) being outer walls of the cartridge filter housing (22), said cartridge filter housing having further walls (32) at right angles to said outer walls, said further walls (32) defining the external air exhaust (33) via exhaust air outlet ports therein.

10. A filter apparatus according to claim 1, wherein in the flow direction the cartridge filter (3) is followed by at least one post-filter (34), the post-filter (34) being a flat activated carbon filter, the end filter being positioned adjacent to the filter cartridges (26) directly on an inside of said further walls (32) provided with the exhaust air outlet ports.

11. A filter apparatus according to claim 1, wherein at least one of the flat filters (38b) is located between the outlet (14b) of the suction fan (8b) and the cartridge filter (3b), said at least one flat filter (38b) being located adjacent to and parallel to the inlet base (23) of the cartridge filter (3b), said at least one flat filter (38b) having a limited spacing from said inlet base (23b).

12. A filter apparatus according to claim 1, wherein means are provided for opening a housing wall of a housing, thereby providing a suction opening for contaminated air, said housing wall being associated with the inlet side (40) of said initial inlet filter (39), said housing wall being formed by a collapsible hood (52) defining a vacuum area.

13. A filter apparatus according to claim 1, further comprising at least one depositing vessel (48) for oil in the contaminated air, means being provided for emptying said depositing vessel (48), said depositing vessel (48) being located below the inlet filter unit in a bottom area of the primary filter housing (35), said inlet filter unit being positioned in an upright standing manner.

14. A filter apparatus according to claim 1, further comprising a pressure measuring device (54) having an indicating means disposed on the apparatus housing (6) for measuring pressure in the housing.

15. A filter apparatus according to claim 14, wherein two pressure gauges are provided for the apparatus housing (6) and for the primary filter housing (35), said pressure gauges (53, 54) being juxtaposed on an outer wall (15) of the apparatus housing (6).

16. A filter apparatus according to claim 1, wherein at least one inlet filter unit (39, 36, 38) is provided upstream of the inlet (13) of the suction fan (8), said inlet filter unit comprising an inlet-side test filter (38), at least one flat filter (38, 39) and at least one primary filter (36), said primary filter (36) being formed by at least one electrostatic filter (36).

17. A filter apparatus according to claim 16, wherein said inlet-side test filter (38) and a primary filter (36) are arranged in a primary filter housing (35) defining the suction opening (44) for contaminated air, said primary filter housing (35) being connected to the said apparatus housing (6) via said flow path, said primary filter houisng (35) being connected to said apparatus housing (6) exclusively via said inlet-side test filter (38), said primary filter housing (35) and said apparatus housing (6) being integrated to a common housing unit, said apparatus housing (6) having upright outer walls, said primary filter housing (35) being connected to one of said upright outer walls (17) of the apparatus housing (6), said primary filter housing (35) having substantially a same cross-section as the apparatus housing (6), said upright outer wall forming an inlet wall (17) defining the suction opening 44.

18. A filter apparatus according to claim 17, further comprising a pressure measuring devcie (53) having an indicating means, operable for measuring pressure in the primary filter housing (35).

19. A filter apparatus according to claim 16, wherein said inlet filter unit has a square dimension, said suction fan (8) having an intake duct (18) provided by a suction funnel having a funnel inlet opening (21), said suction funnel (20) being widened to the square dimension of said inlet filter unit, said suction funnel (20) being connected to said inlet wall (17), said inlet-side test filter (38) being located adjacent to said funnel inlet opening (21).

20. A filter apparatus according to claim 16, wherein on either side of the at least one primary filter (4) is provided at least one inlet-side test filter (39, 38).

21. A filter apparatus according to claim 16, wherein said inlet filter unit has an initial inlet filter (39) across the flow path, said initial inlet filter (39) providing an inlet side (40) having a square dimension, said inlet side (40) of the initial inlet filter (39) being located in a distributing chamber (41), having substantially a same square dimension as the inlet side, means being provided for admitting the contaminated air into the distributing chamber in a direction differing from a direction at right angles to the inlet side (40) of said initial inlet filter (39), said suction opening (44) for contaminated air being provided at a distance from said distributing chamber (41), said primary filter housing (35) having a housing wall (43) located transversely to said inlet side (40), said suction opening (44) for contaminated air being located on said housing wall (43), said housing wall being an upper housing wall (43) of the primary filter housing (35).

* * * * *

UNITED STATES PATENT AND TRADEMARK OFFICE
CERTIFICATE OF CORRECTION

PATENT NO. : 4,787,922

DATED : November 29, 1988

INVENTOR(S) : Gunter Kulitz

It is certified that error appears in the above-identified patent and that said Letters Patent is hereby corrected as shown below:

Title page:

In the abstract, line 17 delete "13" and insert --3--.

Column 1, line 11 delete "opneing" and insert --opening--.

Column 1, line 48 after "cartridge" insert --filter--.

Column 1, line 48-49 delete "construdted" and insert --constructed--.

Column 1, line 59 delete "douwnstream" and insert --downstream--.

Column 2, line 35 delete "further" and insert --filter--.

Column 2, line 35 after "ends" insert a comma.

Column 2, line 47 delete "plaets" and insert --plates--.

Column 3, line 37 delete "thery" and insert --they--.

Column 4, line 1 delete "are" and insert --air--.

Column 4, line 5 after "test" insert --filter--.

Column 5, line 60 after "housing" delete the comma.

UNITED STATES PATENT AND TRADEMARK OFFICE
CERTIFICATE OF CORRECTION

PATENT NO. : 4,787,922

DATED : November 29, 1988

INVENTOR(S) : Gunter Kulitz

It is certified that error appears in the above-identified patent and that said Letters Patent is hereby corrected as shown below:

Column 5, line 61 after "housing" insert a comma.

Column 6, line 31 delete "resistanct" and insert --resistance--.

Column 7, line 11 delete "possible" and insert --possibly--.

Column 7, line 13 delete "appratus" and insert --apparatus--.

Column 7, line 20 delete "to".

Column 8, line 33 delete "electrostaic" and insert --electrostatic--.

Column 9, line 31 delete "appratus" and insert --apparatus--.

Column 9, line 35 delete "disturbing" and insert --distributing--.

UNITED STATES PATENT AND TRADEMARK OFFICE
CERTIFICATE OF CORRECTION

PATENT NO. : 4,787,922

DATED : November 29, 1988

INVENTOR(S) : Gunter Kulitz

It is certified that error appears in the above-identified patent and that said Letters Patent is hereby corrected as shown below:

Column 10, line 28 delete "to", first occurrence, and insert --then--.

Column 10, line 39 delete "then" and insert --to--.

Column 13, line 2 delete "houisng" and insert --housing--.

Signed and Sealed this

Fourteenth Day of November, 1989

Attest:

JEFFREY M. SAMUELS

*Attesting Officer*   *Acting Commissioner of Patents and Trademarks*